(12) United States Patent
Murakami et al.

(10) Patent No.: US 10,175,076 B2
(45) Date of Patent: Jan. 8, 2019

(54) ULTRASONIC FLOW METER

(71) Applicant: RYUSOK CO., LTD., Okinawa-ken (JP)

(72) Inventors: Eiichi Murakami, Tokyo (JP); Kohei Sakiyama, Tokyo (JP)

(73) Assignee: RYUSOK CO., LTD., Okinawa-Ken (JP)

( * ) Notice: Subject to any disclaimer, the term of this patent is extended or adjusted under 35 U.S.C. 154(b) by 0 days.

(21) Appl. No.: 15/869,196

(22) Filed: Jan. 12, 2018

(65) Prior Publication Data

US 2018/0283917 A1  Oct. 4, 2018

(30) Foreign Application Priority Data

Mar. 31, 2017 (JP) ................................. 2017-071520
Sep. 4, 2017 (JP) ................................. 2017-169363

(51) Int. Cl.
*G01F 1/66* (2006.01)

(52) U.S. Cl.
CPC .............. *G01F 1/662* (2013.01); *G01F 1/667* (2013.01)

(58) Field of Classification Search
CPC ... G01F 1/66; G01F 11/00; G01F 5/00; G01F 1/68
See application file for complete search history.

(56) References Cited

U.S. PATENT DOCUMENTS

| | | | | |
|---|---|---|---|---|
| 7,258,025 B2* | 8/2007 | Doihara | ................ | G01F 1/8409 73/861.355 |
| 7,574,908 B2* | 8/2009 | Ueda | ..................... | G01F 1/6842 73/202 |
| 7,907,059 B1* | 3/2011 | Guy | ....................... | G01F 23/242 137/392 |
| 8,544,344 B2* | 10/2013 | Murakami | .............. | G01F 15/14 73/861.28 |
| 9,003,877 B2* | 4/2015 | Qasimi | ................. | G01F 1/6842 73/204.22 |
| 9,194,390 B1* | 11/2015 | Ruiter | ..................... | F04B 53/10 |
| 9,441,617 B2* | 9/2016 | Kazumasa | .............. | F04B 9/105 |

FOREIGN PATENT DOCUMENTS

JP        2013-104838 A      5/2013

\* cited by examiner

*Primary Examiner* — Jewel V Dowtin
(74) *Attorney, Agent, or Firm* — Li & Cai Intellectual Property (USA) Office (57) ABSTRACT

An inlet conduit and an outlet conduit are disposed in a so-called crank shape with respect to a straight conduit. The straight conduit is provided with wall surfaces with which piezoelectric elements come into abutment from outside, and ultrasonic transceiver units are demountably mounted on the outside of the wall surfaces respectively. The two ultrasonic transceiver units have the same shape, and each include a covering member formed of a synthetic resin, the piezoelectric element provided in the covering member for transmitting and receiving an ultrasonic beam, and a cable connected to the piezoelectric element. The conduit portion and the ultrasonic transceiver unit are assembled separately. The ultrasonic transceiver units are disposed on both sides of the conduit portion and are coupled thereto with screws.

10 Claims, 9 Drawing Sheets

ULTRASONIC FLOW METER

BACKGROUND OF THE INVENTION

1. Field of the Invention

The present invention relates to an ultrasonic flow meter configured to measure a flow rate of a fluid in piping used in various industrial fields.

2. Description of Related Art

An ultrasonic flow meter includes piezoelectric elements for transmitting and receiving an ultrasonic beam fixed at, for example, both ends of a crank-shaped conduit portion. The piezoelectric elements measure times required for an ultrasonic beam to propagate from one end to the other end and from the other end to one end, respectively, of a conduit portion in which a fluid flows, and obtain a flow rate of the fluid flowing in the conduit portion from the difference between the respective propagating times.

The crank-shaped conduit portion described above is typically formed of a synthetic resin, includes a straight pipe portion, an inlet conduit, and an outlet conduit, and requires mounting portions for the piezoelectric elements at both sides of the straight pipe portion. The conduit portion is complicated in structure, and thus is difficult to mold by injection molding at one time. Therefore, the conduit portion is manufactured by molding several parts separately and joining together.

Figure 9:
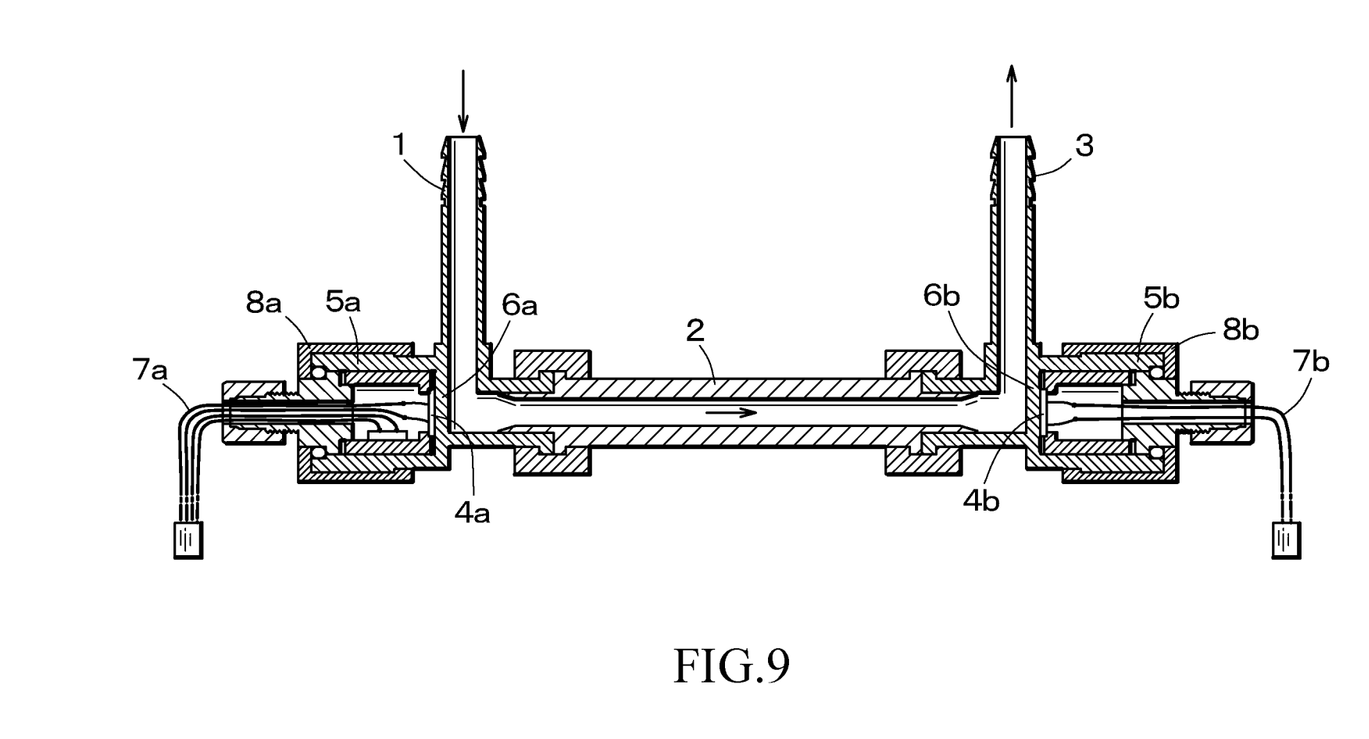
FIG. 9 is a cross-sectional view of an ultrasonic flow meter of the related art.

JP-A-2013-104838 discloses an ultrasonic flow meter having a configuration as described above. As illustrated in FIG. 9, a fluid to be measured passes through an inlet conduit 1, a straight pipe portion 2, and an outlet conduit 3 in a crank shape, and the flow rate is measured based on propagation velocities of an ultrasonic beam in the straight pipe portion 2. Piezoelectric elements 4a and 4b are mounted at both sides of the straight pipe portion 2, and the piezoelectric elements 4a and 4b alternately transmit and receive ultrasonic beams through the straight pipe portion 2.

The piezoelectric elements 4a and 4b are accommodated in cylindrical portions 5a and 5b formed integrally with the inlet conduit 1 and the outlet conduit 3 and are adhered to inner walls 6a and 6b on both side portions of the straight pipe portion 2. Lead wires 7a and 7b are respectively connected to the piezoelectric elements 4a and 4b. In order to protect the piezoelectric elements 4a and 4b, covers 8a and 8b having a cap-nut shape are respectively engaged with the cylindrical portions 5a and 5b from the outside.

When the fluid to be measured is a corrosive fluid, the inlet conduit 1, the straight pipe portion 2, and the outlet conduit 3 are required to be formed of an expensive corrosion-resistant resin, for example, fluororesin such as PTFE or PFA. The corrosion-resistant resin needs to be used also for the cylindrical portions 5a and 5b because these members are molded integrally with the inlet conduit 1 and the outlet conduit 3.

The covers 8a and 8b to be fitted to the cylindrical portions 5a and 5b, having a screwing structure in the same manner, are preferably formed of the same material as the cylindrical portions 5a and 5b considering a coefficient of expansion and the like.

In the related art described above, as the covers 8a and 8b have a structure to be mounted on the cylindrical portions 5a and 5b by screwing so as to surround the cylindrical portions 5a and 5b in which the piezoelectric elements 4a and 4b are accommodated, the volume of the covers 8a and 8b inevitably becomes large. In addition, since the lead wires 7a and 7b are led out in a direction of an extended line of the straight pipe portion 2, a problem of positional limitation for installation of the ultrasonic flow meter arises.

Since the ultrasonic flow meter used for semiconductor manufacturing facilities handles a corrosive fluid, a corrosion-resistant resin needs to be used for the conduit portion as described above. However, the corrosion-resistant resin is more expensive than general synthetic resins such as polyethylene and polypropylene. Therefore, if the corrosion-resistant resin is used also for the cylindrical portions 5a and 5b and the covers 8a and 8b which do not come into contact with a liquid, manufacturing cost becomes relatively high.

In addition, in the ultrasonic flow meter of the related art, necessity of complex assembly works such as building the piezoelectric elements 4a and 4b into the cylindrical portions 5a and 5b, and then soldering lead wires 7a and 7b thereto is another problem. Furthermore, when the piezoelectric elements or the like fail to operate properly during operation, it is not easy to change only the piezoelectric elements or the like on site.

SUMMARY OF THE INVENTION

It is an object of the invention to solve the above-described problems and to provide an ultrasonic flow meter which is easy to mount on a conduit portion, has a compact structure around a piezoelectric element, and is inexpensive because an ultrasonic transceiver unit having a covering member formed of an inexpensive material is assembled separately from the conduit portion in which a fluid flows.

In order to achieve the above-described object, the invention provides an ultrasonic flow meter including a crank-shaped conduit portion in which a fluid flows and a pair of ultrasonic transceiver units to be demountably mounted on both sides of a straight conduit of the conduit portion, the ultrasonic transceiver units each including a covering member; a piezoelectric element disposed in the covering member and configured to transmit and receive an ultrasonic beam; and a cable portion connected to the piezoelectric element and led outward from the covering member, wherein a flow rate of a fluid flowing in the straight conduit is measured based on a propagation velocity of an ultrasonic beam obtained by transmitting and receiving the ultrasonic beam in the straight conduit from and to transmitting and receiving surfaces of the piezoelectric elements.

According to an example, the transmitting and receiving surface of the piezoelectric element is exposed from an opened end of the ultrasonic transceiver unit.

According to another example, the opened end of the ultrasonic transceiver unit is covered with a front plate with the transmitting and receiving surface of the piezoelectric element being in internal contact thereto.

Advantageous Effects of Invention

According to the ultrasonic flow meter of the invention, separately provided ultrasonic transceiver units are easily mounted on both sides of the straight conduit, a compact structure is achieved, and in addition, a less amount of usage of an expensive corrosion-resistant resin is required.

DETAILED DESCRIPTION OF THE PREFERRED EMBODIMENTS

Referring now to FIG. 1 to FIG. 8, the invention will be described in detail based on Examples.

Example 1

Figure 1:
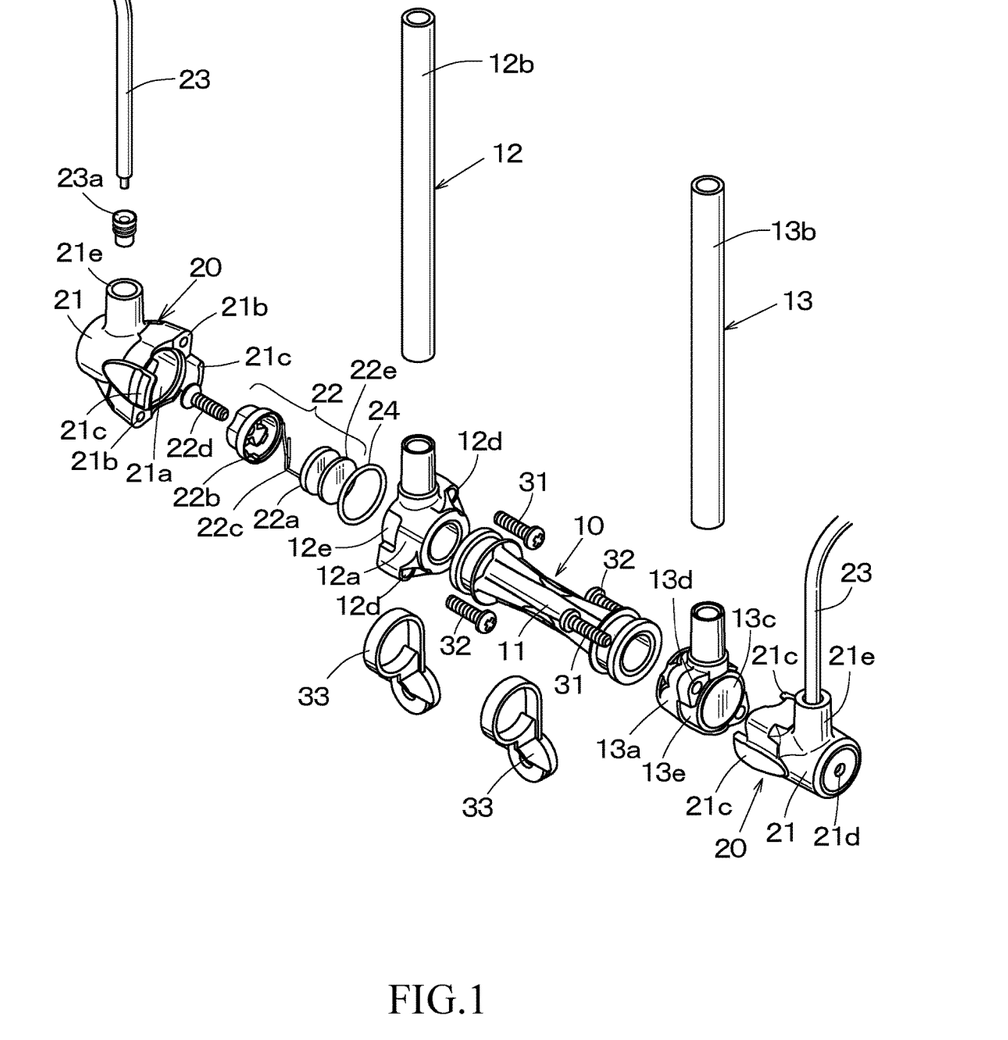
FIG. 1 is an exploded perspective view of an ultrasonic flow meter according to Example 1.
Figure 2:
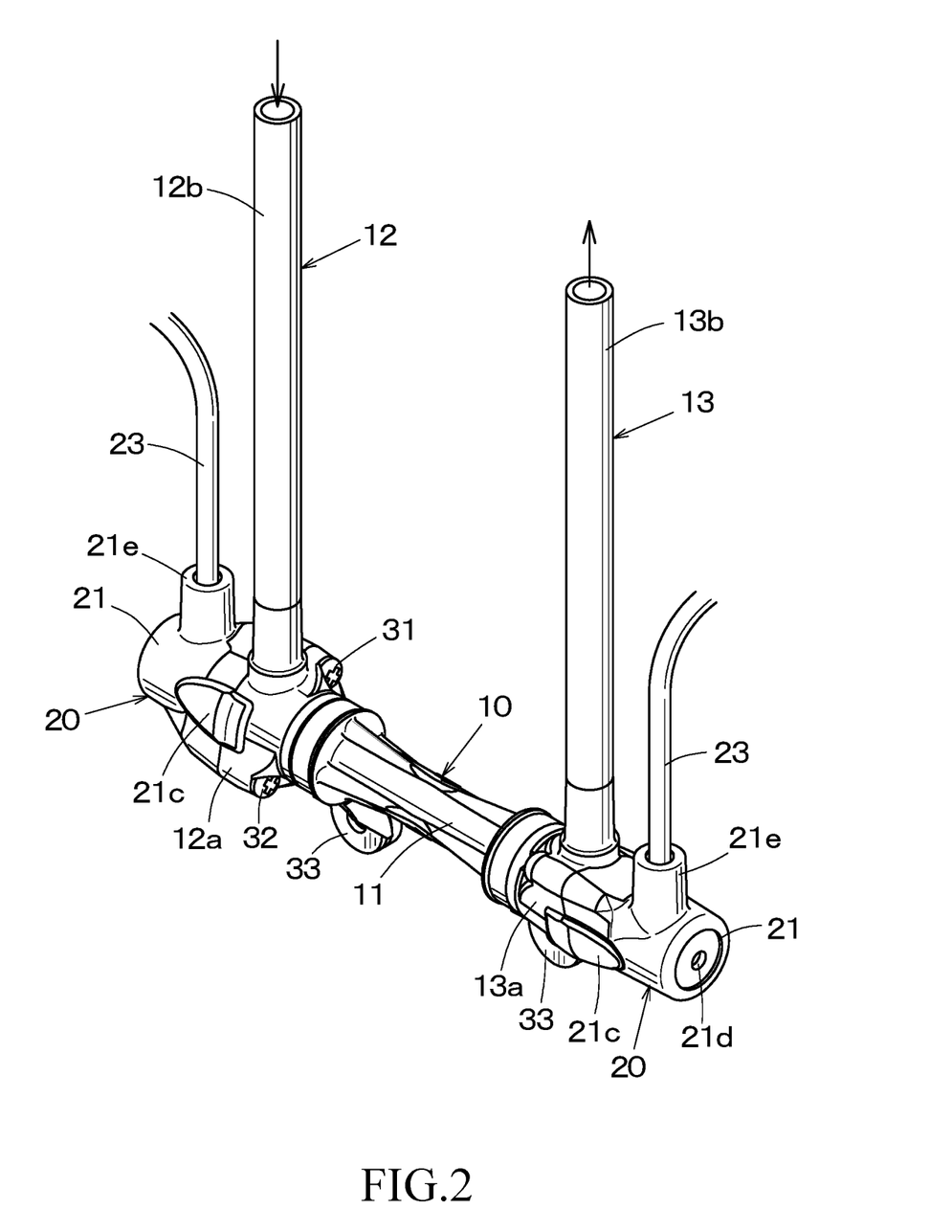
FIG. 2 is a perspective view of the ultrasonic flow meter.
Figure 3:
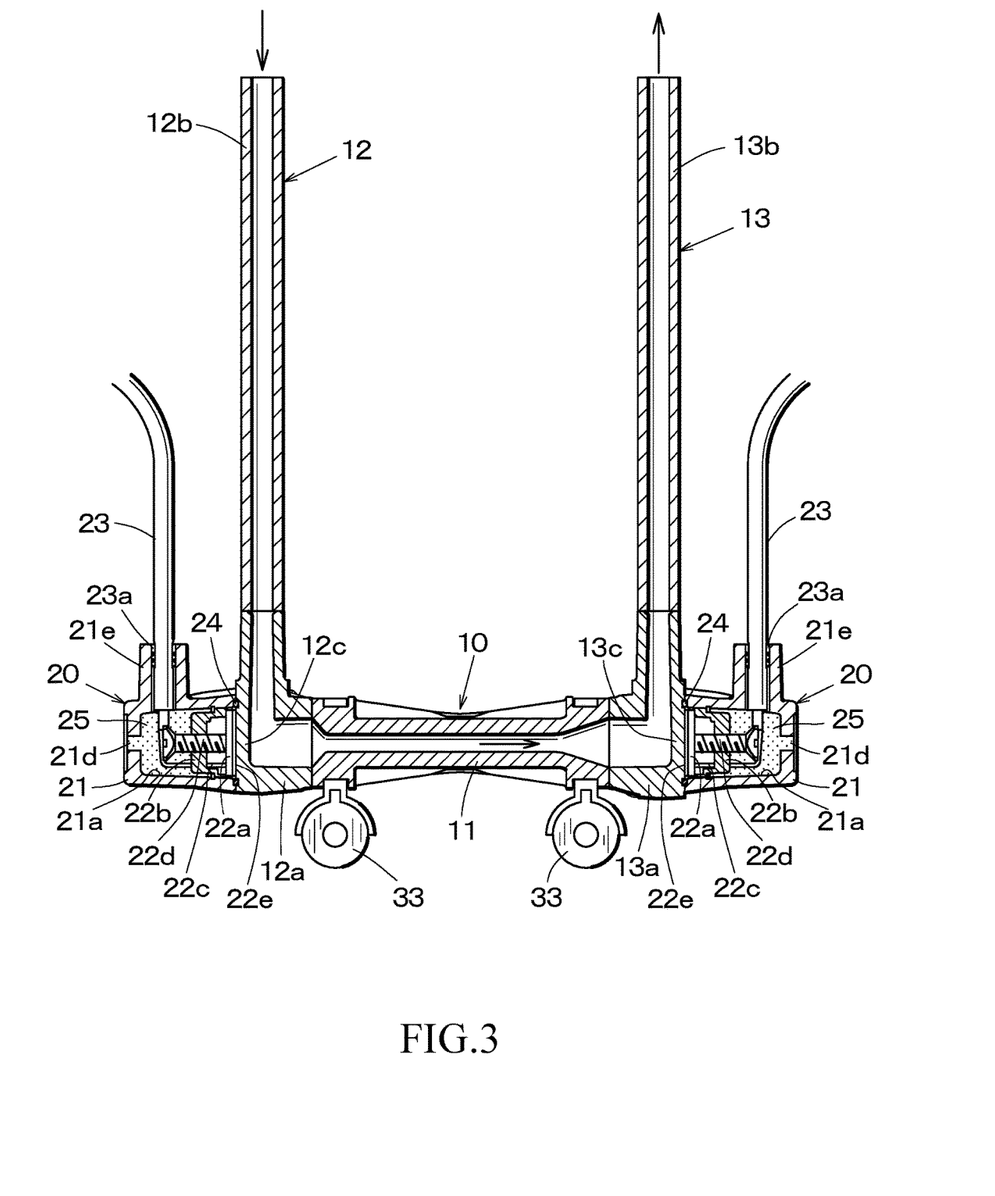
FIG. 3 is a cross-sectional view of the ultrasonic flow meter in an assembled state.
Figure 4:
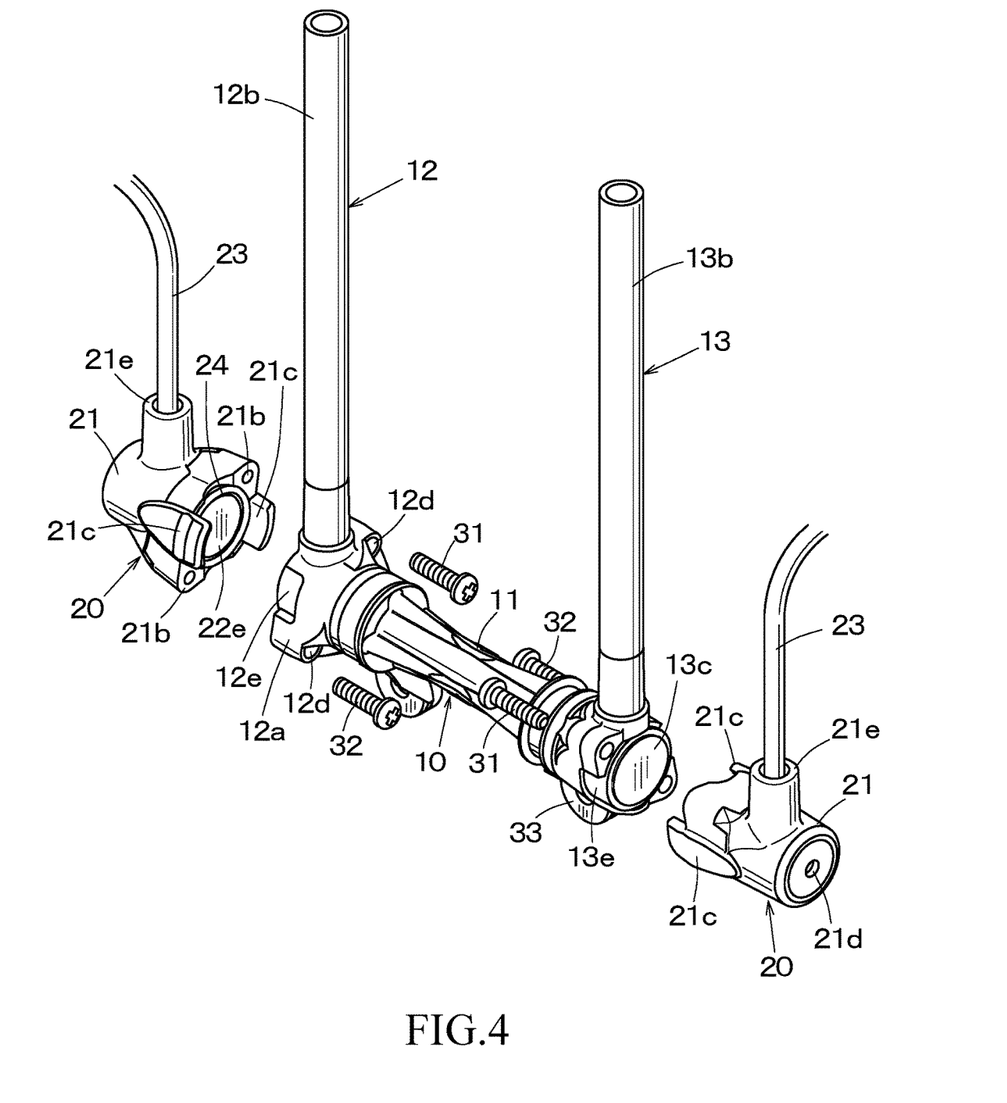
FIG. 4 is a perspective view of a process of mounting ultrasonic transceiver units to a conduit portion.

FIG. 1 is an exploded perspective view of an ultrasonic flow meter according to Example 1, FIG. 2 is a perspective view of an assembled state, FIG. 3 is a cross-sectional view, and FIG. 4 is a perspective view of a process of mounting an ultrasonic transceiver unit on a conduit portion.

The ultrasonic flow meter of Example 1 mainly includes a conduit portion 10 in which a fluid flows, and a pair of ultrasonic transceiver units 20 to be mounted on both sides of the conduit portion 10.

The conduit portion 10 includes a straight conduit 11, an inlet conduit 12 coupled to one end of the straight conduit 11 in an L-shape by thermal welding or the like to allow the fluid to flow therein from a direction perpendicular to the straight conduit 11, and an outlet conduit 13 coupled to the other end of the straight conduit 11 in an L-shape and allow the fluid to flow out from the straight conduit 11 to the direction perpendicular thereto. The inlet conduit 12 and the outlet conduit 13 are disposed in a so-called crank shape with respect to the straight conduit 11.

The conduit portion 10 is formed of a corrosion-resistant resin such as PTFE and PFA, and the straight conduit 11, the inlet conduit 12, and the outlet conduit 13 molded separately by an injection mold or the like are joined by thermal welding or the like. By employing a transparent member for the conduit portion 10, the flow of the fluid may be visually confirmed.

For example, the inlet conduit 12 and the outlet conduit 13 have an inner diameter of 4 mm, and the straight conduit 11 has an inner diameter of 4 mm. The inner diameters of both ends of the straight conduit 11 have a tapered shape increasing in diameter toward body portions 12a and 13a of the inlet conduit 12 and the outlet conduit 13 to prevent resistance from generating in a flow channel.

The inlet conduit 12 and the outlet conduit 13 are formed of members having the same shape, and respectively include the body portions 12a and 13a each having a flow channel of an L-shape in cross section, and pipe body portions 12b and 13b connected to the body portions 12a and 13a on an upstream side and a downstream side respectively.

The body portions 12a and 13a and the pipe body portions 12b and 13b are joined respectively by thermal welding or the like, and when in use, a fluid conduit is coupled to distal ends of the pipe body portions 12b and 13b.

The body portions 12a and 13a to be disposed on both sides of the straight conduit 11 are provided respectively with wall surfaces 12c and 13c each having a planer shape extending orthogonally to an axial direction of the straight conduit 11 and facing each other in the vicinity of corner portions of the flow channels each having an L-shape in cross-section.

Ultrasonic transceiver units 20 each having a piezoelectric element in the interior thereof are demountably mounted respectively outside the wall surfaces 12c and 13c facing each other.

The body portions 12a and 13a are provided respectively on outer peripheries thereof with pairs of screw insertion holes 12d and 13d extending along an axial direction of the straight conduit 11, and pairs of guide receiving portions 12e and 13e with which guide strips of the ultrasonic transceiver units 20 abut.

The two ultrasonic transceiver units 20 have the same shape and each include a covering member 21 formed of a synthetic resin such as FRP, a transmitter unit 22 fixed in the covering member 21, and a cable portion 23 connected to the transmitter unit 22 and led out from part of the covering member 21 to a flow rate computation measuring unit provided on the exterior thereof.

The covering member 21 has a generally-used substantially cylindrical shape molded of an inexpensive and hard synthetic resin, has an opened end in the front, which corresponds to a mounting side with respect to the conduit portion 10, and is closed at the rear.

The covering member 21 is provided with a storage portion 21a for accommodating the transmitter unit 22, and a pair of screw holes 21b into which distal ends of two screws 31 and 32 inserted through the screw insertion holes 12d and 12d of the inlet conduit 12 and the outlet conduit 13 are respectively screwed.

The covering members 21 are each provided on outside thereof with a pair of guide strips 21c having a function to guide the guide receiving portions 12e and 13e when mounting the covering members 21 to the inlet conduit 12 and the outlet conduit 13 so as to extend toward the body portions 12a and 13a. In addition, the covering member 21 is provided at an outer end portion thereof with a small hole 21d which communicates with the interior of the storage portion 21a.

The transmitter unit 22 in the storage portion 21a includes a piezoelectric element 22a, a retaining member 22b, a lead wire 22c, and an adjustment screw 22d. The piezoelectric element 22a transmits and receives an ultrasonic beam. The retaining member 22b fits on the piezoelectric element 22a and holds the piezoelectric element 22a so as not to allow rotation and fore-and-aft movement with respect to the storage portion 21a. The lead wire 22c is connected to the piezoelectric element 22a and is led out from a hole portion provided on the retaining member 22b. The adjustment screw 22d is screwed into a screw hole provided at a center of the retaining member 22b for pressing the piezoelectric element 22a for adjustment, and is formed of a synthetic resin or the like.

The piezoelectric element 22a has a thin disk shape, and may be provided with an acoustic matching plate 22e having the same shape adhered to the surface thereof as needed. The piezoelectric element 22a is held by the retaining member 22b with the acoustic matching plate 22e exposed outside.

Interposed between the coupled body portions 12a and 13a and the covering members 21 are O-rings 24 having a waterproof property to prevent water from entering the interior of the storage portion 21a through joining sections.

The covering member 21 is provided on a rear portion thereof with a cylindrical cable lead-out portion 21e extending upward in parallel to a direction of the surface of the piezoelectric element 22a, and the lead wire 22c is soldered to the cable portion 23 within the storage portion 21a. The cable portion 23 is led out from the interior of the storage portion 21a via the cable lead-out portion 21e, and the other end thereof is configured to be connectable to a flow rate computation measuring unit, which is not illustrated.

A waterproof bush 23a is inserted into the cable portion 23 to prevent water from entering the storage portion 21a from the cable lead-out portion 21e. The cable lead-out portion 21e, being provided to extend upward in Example 1, may be provided to extend downward or sideward.

The straight conduit 11 is configured to allow fitting of supporting members 33 thereto, so that the ultrasonic flow meter is supported by utilizing mounting holes provided on the supporting members 33.

When assembling, the conduit portion 10 and the ultrasonic transceiver units 20 are assembled separately. In the ultrasonic transceiver unit 20, the lead wire 22c is connected to the cable portion 23 in the interior of the storage portion 21a first, then the retaining member 22b having the adjustment screw 22d screwed therethrough is inserted into the storage portion 21a from the opened end thereof, and then the retaining member 22b is fixed by a fixing mechanism, which is not illustrated, so as not to allow the rotation and the fore-and-aft movement in the storage portion 21a.

Subsequently, the transmitter unit 22 having the acoustic matching plate 22e integrally adhered to a front surface thereof is inserted into the storage portion 21a from the front opened side, and is hooked on and fixed to the front of the covering member 21 so that the transmitting and receiving surface faces forward.

When coupling the ultrasonic transceiver units 20 assembled in this manner to both sides of the conduit portion 10, transmitting media formed of a soft member which facilitates transmission of ultrasonic waves such as sheet-type silicon gel or grease are interposed between the acoustic matching plates 22e and the wall surfaces 12c and 13c respectively as illustrated in FIG. 4. Propagation of the ultrasonic wave between the conduit portion 10 and the ultrasonic transceiver units 20 is enabled by these transmission media.

In addition, the guide strips 21c are slid along the guide receiving portions 12e and 13e of the inlet conduit 12 and the outlet conduit 13 to bring the covering members 21 into a state of being pushed onto the outer sides of the body portions 12a and 13a.

Subsequently, the screws 31 and 32 are inserted into the screw insertion holes 12d and 13d respectively, and then the screws 31 and 32 are further screwed into and fixed to the screw holes 21b, so that mounting surfaces of the ultrasonic transceiver units 20 come into abutment with the wall surfaces 12c and 13c of the conduit portion 10. The ultrasonic transceiver units 20 are integrally coupled to both sides of the straight conduit 11 of the conduit portion 10.

Simultaneously, joining sections between the covering member 21 and the wall surfaces 12c and 13c are maintained in a waterproof state by the O-rings 24, and the silicon gel or the grease is stably held.

Subsequently, outputs from the piezoelectric elements 22a are adjusted. The ends of the two cable portions 23 are connected to the flow rate computation measuring unit, and the adjustment screws 22d are rotated with respect to the retaining members 22b by a screw driver inserted from the small holes 21d of the covering members 21 while receiving an ultrasonic beam output from one of the piezoelectric elements 22a by the other piezoelectric element 22a opposing thereto.

Distal ends of the adjustment screws 22d press back surfaces of the piezoelectric elements 22a to change the degree of adhesion of the transmitting and receiving surfaces with respect to the wall surfaces 12c and 13c, so that transmitting and receiving performances of the piezoelectric elements 22a of the ultrasonic transceiver units 20 are respectively adjusted to predetermined values.

At this time, the transmitting and receiving performances of the piezoelectric elements 22a with respect to an actual flow rate may be calibrated as needed by flowing a liquid of a reference flow rate actually into the conduit portion 10 and transmitting and receiving an ultrasonic beam alternately from the piezoelectric elements 22a through the straight conduit 11.

When the adjustment is terminated, a curable silicon resin 25 or the like is filled into the storage portions 21a through the small holes 21d of the covering member 21 and is cured. Accordingly, the tightening amounts of the adjustment screws 22d are fixed and entry of water into the storage portions 21a is prevented, whereby electrical insulating properties in the storage portions 21a are ensured. Note that by sealing the small holes 21d by separate sealing members, the interior of the storage portions 21a may have a waterproof structure without being filled with the silicon resin 25.

The ultrasonic flow meter assembled in this manner has an ability to measure the flow velocity, that is, the flow rate of a fluid to be measured flowed into the conduit portion 10 by measuring propagation velocities of ultrasonic beams transmitted and received alternately between the wall surfaces 12c and 13c by the pair of piezoelectric elements 22a in the straight conduit 11 by a flow rate measurement computation unit connected to the piezoelectric elements 22a.

In Example 1, with the ultrasonic transceiver units 20 mounted on both sides of the straight conduit 11, the ultrasonic flow meter has a compact structure compared with the ultrasonic flow meter having the piezoelectric elements integrated therein like in the example of the related art, and is also easy to assemble because the cable portions 23 may be led out sideward. In addition, since the piezoelectric elements 22a having a larger diameter than those of the related art may be used, the piezoelectric elements 22a may have higher outputs and thus higher degree of accuracy is achieved.

Furthermore, since the covering members 21 of the ultrasonic transceiver units 20 may be formed of a less expensive synthetic resin than the material for the conduit portion 10, the ultrasonic flow meter may be manufactured at lower costs.

In addition, when the ultrasonic transceiver unit 20 fails, the ultrasonic transceiver unit 20 may be demounted from the conduit portion 10 by removing the screws 31 and 32 and replaced by a new ultrasonic transceiver unit 20.

Example 2

Figure 5:
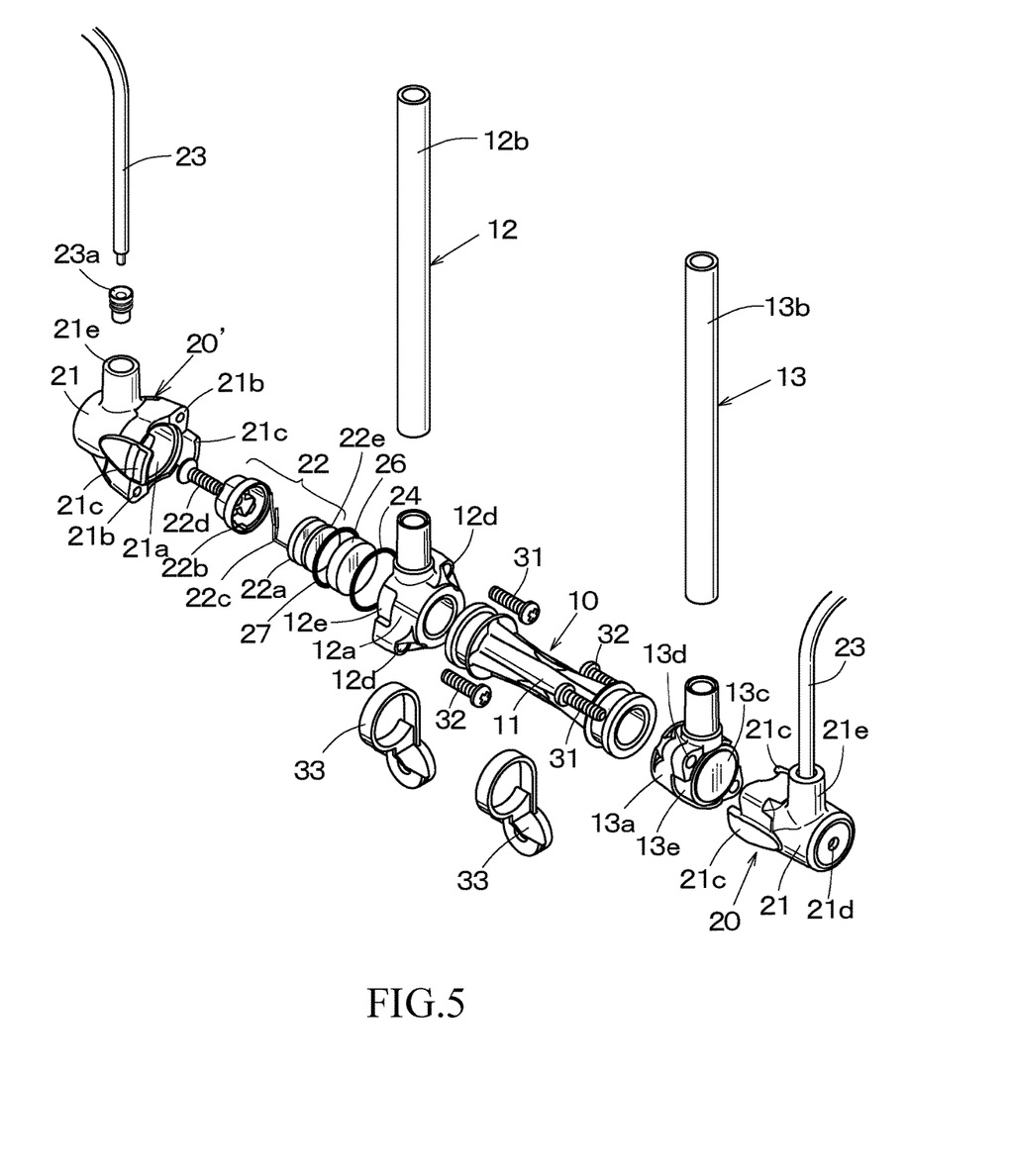
FIG. 5 is an exploded perspective view of the ultrasonic flow meter according to Example 2.
Figure 6:
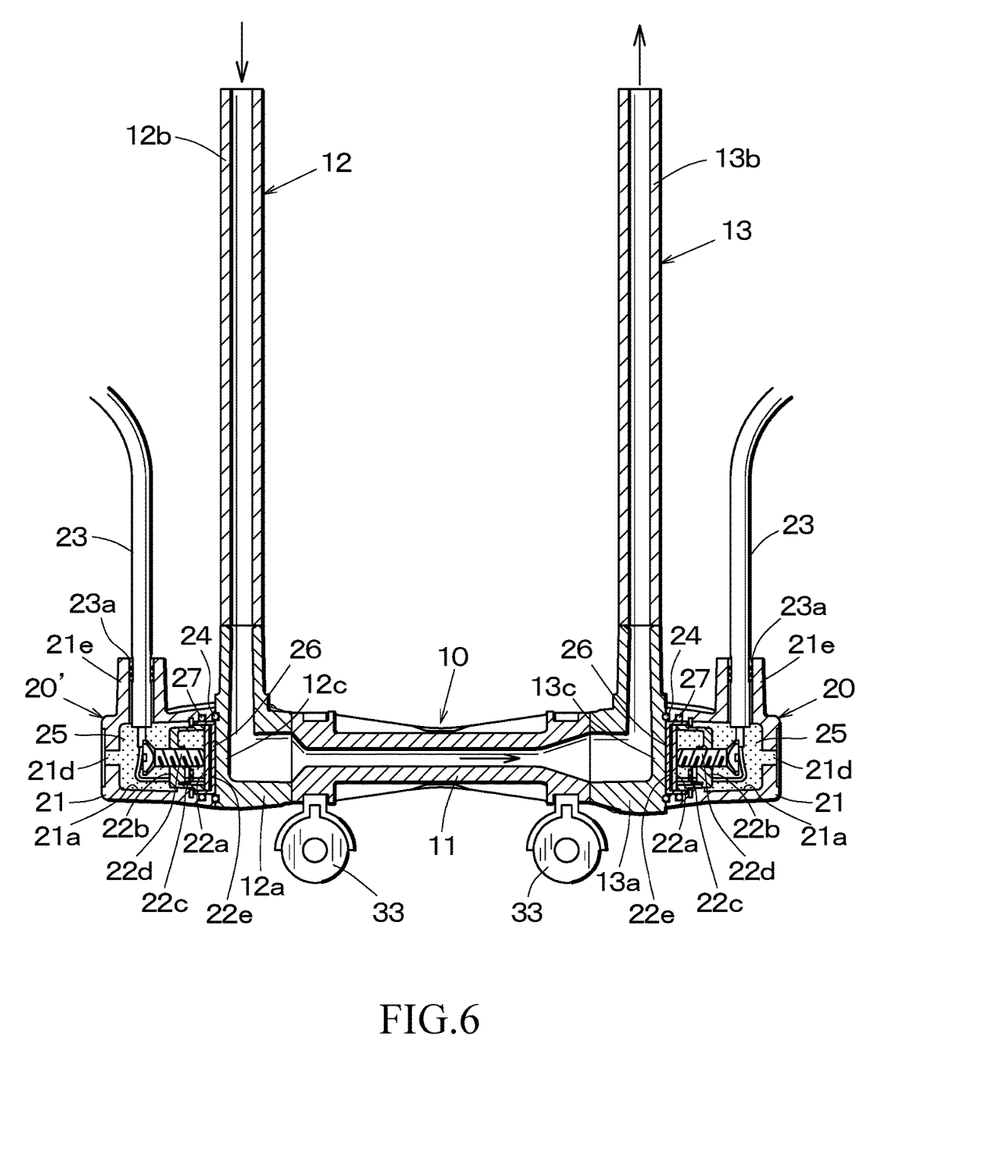
FIG. 6 is a cross-sectional view of the ultrasonic flow meter in an assembled state.
Figure 7:
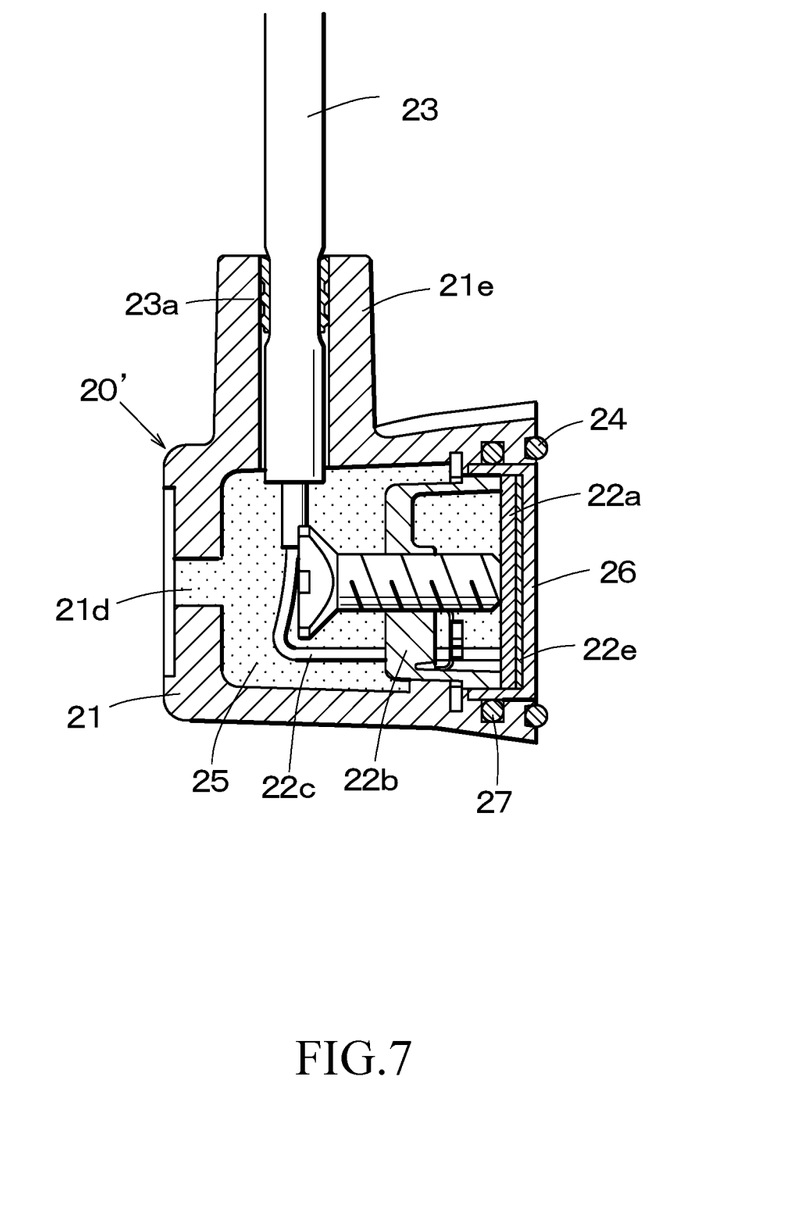
FIG. 7 is an enlarged cross-sectional view of the ultrasonic transceiver unit.
Figure 8:
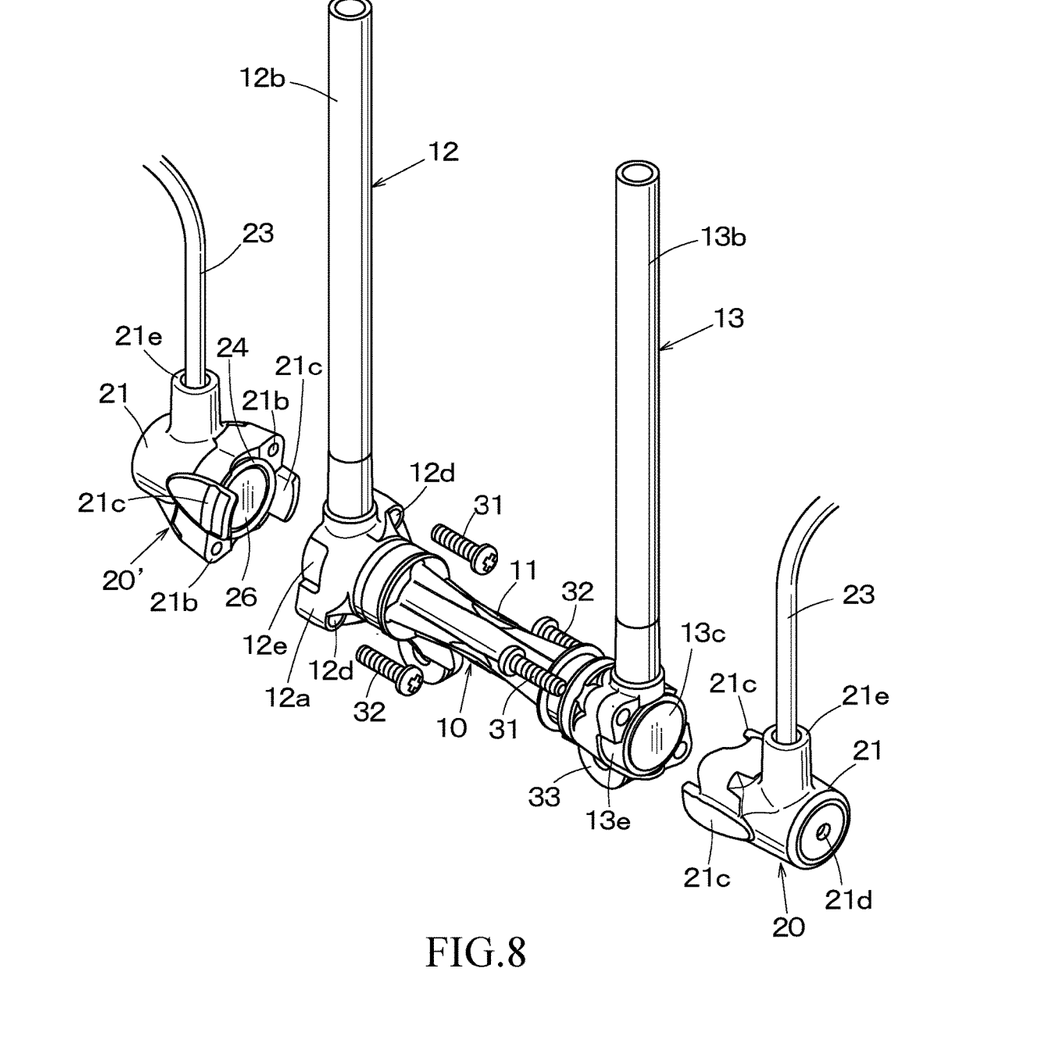
FIG. 8 is a perspective view of a process of mounting the ultrasonic transceiver units to the conduit portion.

FIG. 5 is an exploded perspective view of the ultrasonic flow meter according to Example 2, FIG. 6 is a cross-sectional view, FIG. 7 is an enlarged cross-sectional view of the ultrasonic transceiver unit, and FIG. 8 is a perspective view illustrating a process of mounting the ultrasonic transceiver unit on the conduit portion. An external perspective view is almost the same as that of Example 1. Note that the same reference numerals as those in Example 1 denote the same members.

While the piezoelectric elements 22a are directly disposed on the opened end sides of the covering members 21 of the ultrasonic transceiver units 20 in Example 1, front plates 26 formed of a synthetic resin are disposed on the opened end sides of the covering members 21 of two ultrasonic transceiver units 20' in Example 2, so that the interiors of the covering members 21 are closed.

The front plate 26 is a synthetic resin plate formed of FRP or the like and capable of propagating ultrasonic waves, has a short cylindrical shape closed at one end, and is configured to be pushed into the covering members 21 opened in the front. The transmitter unit 22 including the piezoelectric element 22a is in internal contact with the front plate 26 on the rear side thereof.

The structure in the storage portion 21a is substantially the same as that of Example 1, and main components of the transmitter unit 22 are fixed to the retaining member 22b. The front plate 26 is fitted into the retaining member 22b and fixed thereto without being pulled out. An O-ring 27 is disposed on an outer periphery of a cylindrical portion of the front plate 26 so as to prevent a liquid from entering the storage portion 21a from between an inner wall of the covering member 21 and the outer periphery of the front plate 26.

When assembling the ultrasonic transceiver unit 20', the lead wire 22c is led into the storage portion 21a from an opening portion of the covering member 21, and the lead wire 22c is connected to the cable portion 23 led through the cable lead-out portion 21e. Subsequently, the retaining member 22b having the adjustment screw 22d attached thereto is inserted into the storage portion 21a, and the retaining member 22b is fixed so as not to allow the fore-and-aft movement and the rotation in the storage portion 21a.

Subsequently, the piezoelectric element 22a having the acoustic matching plate 22e integrated therein is pushed into the storage portion 21a. The distal end of the adjustment screw 22d which is already attached is brought into abutment with the back side of the piezoelectric element 22a to determine the push-in position.

In addition, the front plate 26 is pushed into the storage portion 21a, and the retaining member 22b fixes the front plate 26 so as not allow the fore-and-aft movement. In this state, the acoustic matching plate 22e and the piezoelectric element 22a are positioned so as to be overlapped with a back surface of a disk portion of the front plate 26.

The ultrasonic transceiver unit 20' assembled in this manner adjusts the transmission and reception of the piezoelectric elements 22a with the cable portions 23 connected to the flow rate measurement computation unit. The ultrasonic transceiver unit 20' is mounted on a schematic conduit unit, which is a straight conduit filled with a fluid equivalent to the fluid to be measured, and the adjustment is performed while transmitting and receiving ultrasonic beams alternately between one piezoelectric element 22a and the piezoelectric element 22a disposed on an opposite side of the straight conduit.

In the same manner as Example 1, adjustment of transmission and reception is performed by adjusting a pressing force of the piezoelectric element 22a with respect to the front plate 26 by rotating the adjustment screw 22d with the screw driver inserted from the small holes 21d of the covering member 21. Accordingly, the transmitting and receiving performances of the piezoelectric element 22a via the cable portion 23 are set to predetermined values.

In this manner, the ultrasonic transceiver unit 20' after adjustment of the transmitting and receiving performances of the piezoelectric element 22a has finished is filled with the silicon resin 25 or the like in the interior of the storage portion 21a as needed so that fixation of the components and the electrical insulating properties are ensured in the same manner as Example 1.

The assembled ultrasonic transceiver unit 20' may be stored or carried in an adjusted state. However, as entry of water into the storage portion 21a from the small hole 21d is further prevented by the O-ring 27 and the waterproof bush 23a, there is no risk of entry of water in the interior, and the adjusted performances are maintained without change.

For usage, the ultrasonic transceiver units 20' are disposed as illustrated in FIG. 8 with respect to the conduit portion 10, and are fixed by the screws 31 and 32 with medium such as sheet-type silicon gel or grease interposed between the front plates 26 and the wall surfaces 12c and 13c so as to facilitate transmission of ultrasonic waves in the same manner as Example 1. Accordingly, the ultrasonic transceiver units 20' are integrally mounted on both sides of the straight conduit 11, and the joining sections between the front plates 26 and the wall surfaces 12c and 13c are closed by the waterproof O-ring 24 to prevent grease or the like from leaking out.

The ultrasonic transceiver unit 20' of Example 2 may be assembled as described above and the piezoelectric element 22a is adjusted in advance. Therefore, a failed ultrasonic transceiver unit may be replaced by the ultrasonic transceiver unit 20' and used temporarily as needed. However, if time allows, the ultrasonic transceiver unit 20' may be mounted on the actual conduit portion 10 and may be adjusted in the same manner as in Example 1 as a matter of course.

When the blood flow rate is measured by an ultrasonic flow meter in cardiac surgery or the like, a disposable ultrasonic flow meter is used and changed for each patient for preventing infection or the like in many cases. However, in such a case, when the piezoelectric element or the like which does not come into contact with blood is used and throw away, economical losses may result. Therefore, only the conduit portion 10 in which blood flows may be throw away after usage, and the ultrasonic transceiver unit 20' may be mounted on a new conduit portion 10 repeatedly, so that the entire part of the ultrasonic flow meter does not have to be thrown away after usage.

What is claimed is:

1. An ultrasonic flow meter including a crank-shaped conduit portion in which a fluid flows and a pair of ultrasonic transceiver units to be demountably mounted on both sides of a straight conduit of the conduit portion,
the ultrasonic transceiver units each including a covering member; a piezoelectric element disposed in the covering member and configured to transmit and receive an ultrasonic beam; and a cable portion connected to the piezoelectric element and led outward from the covering member, wherein
a flow rate of a fluid flowing in the straight conduit is measured based on a propagation velocity of an ultrasonic beam obtained by transmitting and receiving the ultrasonic beam in the straight conduit from and to transmitting and receiving surfaces of the piezoelectric elements.

2. The ultrasonic flow meter according to claim 1, wherein the transmitting and receiving surface of the piezoelectric element is exposed from an opened end of the covering member of the ultrasonic transceiver unit.

3. The ultrasonic flow meter according to claim 1, wherein the ultrasonic transceiver unit is closed by a front plate formed of a material which propagates an ultrasonic wave at the opened end of the covering member, and the transmitting and receiving surface of the piezoelectric element is in internal contact with the front plate.

4. The ultrasonic flow meter according to claim 2, wherein the mounting surfaces of the ultrasonic transceiver units come into abutment with wall surfaces provided at both sides of the straight conduit so as to face each other.

5. The ultrasonic flow meter according to claim 3, wherein the mounting surfaces of the ultrasonic transceiver units come into abutment with wall surfaces provided at both sides of the straight conduit so as to face each other.

6. The ultrasonic flow meter according to claim 4, wherein a soft member which propagates an ultrasonic wave is interposed between the mounting surface of the ultrasonic transceiver unit and the wall surface of the conduit portion.

7. The ultrasonic flow meter according to claim 5, wherein a soft member which propagates an ultrasonic wave is interposed between the mounting surface of the ultrasonic transceiver unit and the wall surface of the conduit portion.

8. The ultrasonic flow meter according to claim 1, wherein the cable portion is led outward from the covering member in parallel to a direction of the surface of the piezoelectric element provided on the ultrasonic transceiver unit.

9. The ultrasonic flow meter according to claim 1, wherein the covering member of the ultrasonic transceiver unit is provided with a guide strip having a function of guiding the conduit portion when being mounted on the conduit portion.

10. The ultrasonic flow meter according to claim 1, wherein the ultrasonic transceiver unit is coupled to the conduit portion with a screw when being mounted on the conduit portion.

* * * * *